US007398050B2

(12) United States Patent
Walker

(10) Patent No.: US 7,398,050 B2
(45) Date of Patent: Jul. 8, 2008

(54) METHOD AND APPARATUS FOR PROCESSING AIR-BORNE DIGITAL DATA RECEIVED IN A MOTOR VEHICLE

(75) Inventor: Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 809 days.

(21) Appl. No.: 10/867,297

(22) Filed: Jun. 14, 2004

(65) Prior Publication Data

US 2005/0277382 A1 Dec. 15, 2005

(51) Int. Cl.
*H04Q 7/20* (2006.01)

(52) U.S. Cl. ........................ 455/3.2; 455/3.1; 455/3.03; 455/3.04; 455/3.05; 455/414.1

(58) Field of Classification Search ................ 455/3.02, 455/3.01, 3.03, 3.04, 3.05, 403, 422.1, 414.1, 455/414.2, 414.3, 414.4, 418, 419, 420, 500, 455/427, 428, 429, 517, 19, 550.1, 3.2, 3.3, 455/3.4, 3.5
See application file for complete search history.

(56) References Cited

U.S. PATENT DOCUMENTS 5,970,085 A * 10/1999 Yi .............................. 370/342
6,823,169 B2 * 11/2004 Marko et al. ............... 455/3.02
2004/0092228 A1 * 5/2004 Force et al. ................... 455/19

* cited by examiner

*Primary Examiner*—Keith T Ferguson
(74) *Attorney, Agent, or Firm*—Jimmy L. Funke

(57) ABSTRACT

A method of communicating data in a satellite digital audio radio (SDAR) system includes transmitting two radio frequency digital signals to a SDAR receiver within a motor vehicle. The two signals include substantially identical information. Each signal includes universal data, and also group-specific data that may or may not be relevant to the particular receiver. The group-specific data is located in a predetermined time location within the signals. This method includes combining the group-specific data from one of the two signals with group-specific data from the other signal to create a group-specific output signal. Similarly, the universal data from one of the two signals is combined with universal data from the other signal to create a universal output signal.

24 Claims, 6 Drawing Sheets

METHOD AND APPARATUS FOR PROCESSING AIR-BORNE DIGITAL DATA RECEIVED IN A MOTOR VEHICLE

TECHNICAL BACKGROUND

The present invention generally relates to the processing of air-borne digital data received in a motor vehicle, and, more particularly, to the processing of satellite digital audio radio ("SDAR") signals received in a motor vehicle.

BACKGROUND OF THE INVENTION

In October of 1997, the Federal Communications Commission (FCC) granted two national satellite radio broadcast licenses. In doing so, the FCC allocated twenty-five (25) megahertz (MHz) of the electromagnetic spectrum for satellite digital broadcasting, 12.5 MHz of which are owned by XM Satellite Radio, Inc. of Washington, D.C. (XM), and 12.5 MHz of which are owned by Sirius Satellite Radio, Inc. of New York City, N.Y. (Sirius). Both companies provide subscription-based digital audio that is transmitted from communication satellites, and the services provided by these and other SDAR companies are capable of being transmitted to both mobile and fixed receivers on the ground.

In the XM satellite system, two (2) communication satellites are present in a geostationary orbit—one satellite positioned at longitude 115 degrees (west) and the other positioned at longitude eight-five (85) degrees (east). Accordingly, the satellites are always positioned above the same spot on the earth. In the Sirius satellite system, however, three (3) communication satellites are present that all travel on the same orbital path, spaced approximately eight (8) hours from each other. Consequently, two (2) of the three (3) satellites are "visible" to receivers in the United States at all times. Since both satellite systems have difficulty providing data to mobile receivers in urban canyons and other high population density areas with limited line-of-sight satellite coverage, both systems use terrestrial repeaters as gap fillers to receive and re-broadcast the same data that is transmitted in the the respective satellite systems.

In order to improve satellite coverage reliability and performance, SDAR systems currently use three (3) techniques that represent different kinds of redundancy known as diversity. The techniques include spatial diversity, time diversity and frequency diversity. Spatial diversity refers to the use of two satellites transmitting near-identical signals from two widely-spaced locations. Time diversity is implemented by introducing a time delay between two signals that contain the same information. In the Sirius satellite system these two time-staggered signals can be otherwise identical. Frequency diversity includes the transmission of signals in different frequency bands. SDAR systems may utilize one, two or all three of these diversity techniques.

When time diversity is utilized in a Sirius SDAR system, a most recently transmitted portion of the earlier-transmitted one of the two identical signals is stored in a memory device in the system's receiver. The time duration of the stored signal portion can be slightly longer than the time delay between the two signals. Thus, if a segment of the later-transmitted one of the two identical signals is not received by the receiver, perhaps due to some obstacle blocking the signal from reaching the receiver, then the portion of the earlier-transmitted signal can be retrieved from memory in order to provide the missing segment of the signal. Similarly, in an XM SDAR system, portions of both of the two signals are stored in memory for the purpose of filling in missing segments in at least one of the two signals. A problem is that memory hardware is expensive, and thus it may be desirable to keep the amount of data that is stored to a minimum. However, the less memory that is available, the shorter the time duration of a signal outage that can be tolerated without losing some data.

This problem of data storage would be exacerbated if the density of the data in the signals were increased, such as by adding more data per unit time. Presently, the SDAR signal may include data that is universally usable by and relevant to all receivers that receive the signal. An example of such universal data would be audio data that the receiver system can convert into an audial signal, such as music or voices that the user can listen to. Ideally, it would be desirable to add data that may be relevant to only a certain sub-group among the receivers that receive the signals. For example, a certain portion of the transmitted signal could be added that is of interest only to passengers in certain makes of automobiles that include the SDAR receivers, such as General Motors automobiles or Ford automobiles. The addition of such group-specific data would increase the amount of data in the signal per unit time. Thus, adding such group-specific data to the signal may be cost prohibitive in terms of the additional memory that would be required to store the additional data. If the available memory were not increased to accommodate the increased data density per unit time, it might drastically reduce the time duration of a signal outage that can be tolerated without losing data.

What is needed in the art is a method of processing SDAR signals that include group-specific data wherein the method does not require a large increase in memory in order to protect against temporary signal outages.

SUMMARY OF THE INVENTION

The present invention provides an apparatus and method for processing SDAR signals wherein a receiver selects and stores in memory only portions of the group-specific data that are relevant to that particular receiver. Thus, the memory requirements for storing group-specific data are reduced.

In one form of the present invention, a method of communicating data in a satellite digital audio radio (SDAR) system includes transmitting two radio frequency digital signals from respective satellites to each of a plurality of SDAR receivers. The two signals include substantially identical information. Each of the SDAR receivers is disposed within a respective one of a plurality of motor vehicles. Each of the signals includes universal data and group-specific data. The universal data is relevant to each of the SDAR receivers. The group-specific data is relevant to less than all of the SDAR receivers. At least one segment of the group-specific data that is relevant to only a corresponding group of the SDAR receivers is in at least one predetermined time location within one of the two signals. At least one of the SDAR receivers in the corresponding group is provided with information identifying the at least one predetermined time location. The at least one SDAR receiver is used to receive the two radio frequency digital signals. The at least one segment of the group-specific data is selected from the at least one predetermined time location within the one of the two signals. The at least one segment of the group-specific data is stored in a memory device. At least one segment of the universal data from the one of the two signals is stored in the memory device. The stored at least one segment of the group-specific data from the one of the two signals is combined with group-specific data from an other of the two signals to thereby create a group-specific output signal. The stored at least one segment of the universal data is combined with universal data from the other of the two signals to thereby create a universal output signal.

In another form of the present invention, a method of communicating air-borne digital data to a motor vehicle includes transmitting two air-borne digital signals to each of a plurality of receivers. The two signals include substantially identical information. Each of the receivers is disposed within a respective one of a plurality of motor vehicles. Each of the signals includes universal data and group-specific data. The universal data is relevant to each of the receivers. The group-specific data is relevant to less than all of the receivers. At least one segment of the group-specific data that is relevant to only a corresponding group of the receivers is in at least one location within one of the two signals. At least one of the receivers in the corresponding group is provided with information identifying the at least one location. The at least one receiver receives the two air-borne digital signals. The at least one segment of the group-specific data is selected from the at least one location within the one of the two signals. The at least one segment of the group-specific data is stored in a memory device. The stored at least one segment of the group-specific data from the one of the two signals is combined with an other of the two signals to thereby create an output signal.

In still another form, the present invention provides a receiver in a motor vehicle for receiving air-borne digital data. The receiver includes at least one antenna receiving two air-borne digital signals including substantially identical information. Each of the signals including universal data and group-specific data. All of the universal data is relevant to the receiver. The group-specific data includes at least one segment that is relevant to the receiver and at least one segment that is irrelevant to the receiver. The at least one relevant segment is in at least one predetermined time location within one of the two signals. A memory device stores information identifying the at least one predetermined time location. A data selecting device selects the at least one relevant segment of the group-specific data from the at least one predetermined time location within the one of the two signals. A memory management device stores the at least one relevant segment of the group-specific data in the memory device. A data combining device combines the stored at least one relevant segment of the group-specific data from the one of the two signals with an other of the two signals.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
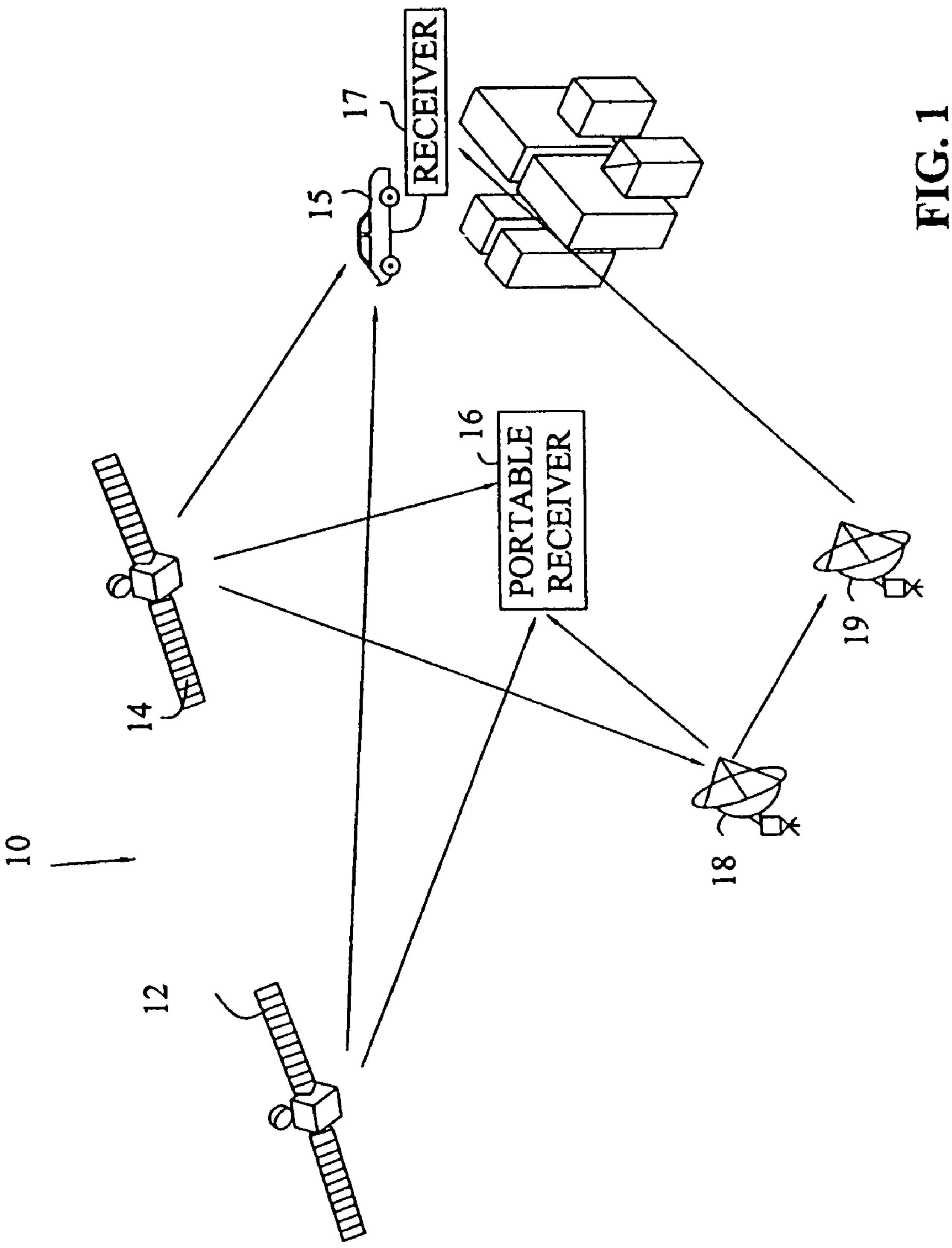
FIG. 1 is a diagrammatic view of one embodiment of a SDAR communication system implementing a method of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

One embodiment of a SDAR system 10 of the present invention is shown in FIG. 1. SDAR system 10 includes first and second communication satellites 12, 14 which transmit line-of-sight signals to SDAR receivers 16, 17 located on the earth's surface. A third satellite may be included in other SDAR systems. Satellites 12, 14, as indicated above, may provide for spatial diversity, frequency diversity and/or time diversity. As shown, receiver 16 is a portable receiver such as a handheld radio or wireless device. Receiver 17 is a mobile receiver for use in vehicle 15. SDAR receivers 16, 17 may also be stationary receivers for use in a home, office or other non-mobile environment. Although only one portable receiver 16 and one mobile receiver 17 is shown in FIG. 1 for ease of illustration, it is to be understood that SDAR system 10 can include any number of portable receivers 16 and mobile receivers 17 which simultaneously receive the same signals from satellites 12, 14.

SDAR system 10 further includes a plurality of terrestrial repeaters 18, 19. Terrestrial repeaters 18, 19 receive and retransmit the satellite signals to facilitate reliable reception in geographic areas where the satellite signals are obscured from the view of receivers 16, 17 by obstructions such as buildings, mountains, canyons, hills, tunnels, etc. The signals transmitted by satellites 12, 14 and terrestrial repeaters 18, 19 are received by receivers 16, 17, which combine and/or transform the signals to create an output signal. It is possible for either or both of satellites 12, 14 to transmit signals to either or both of repeaters 18, 19.

Figure 2:
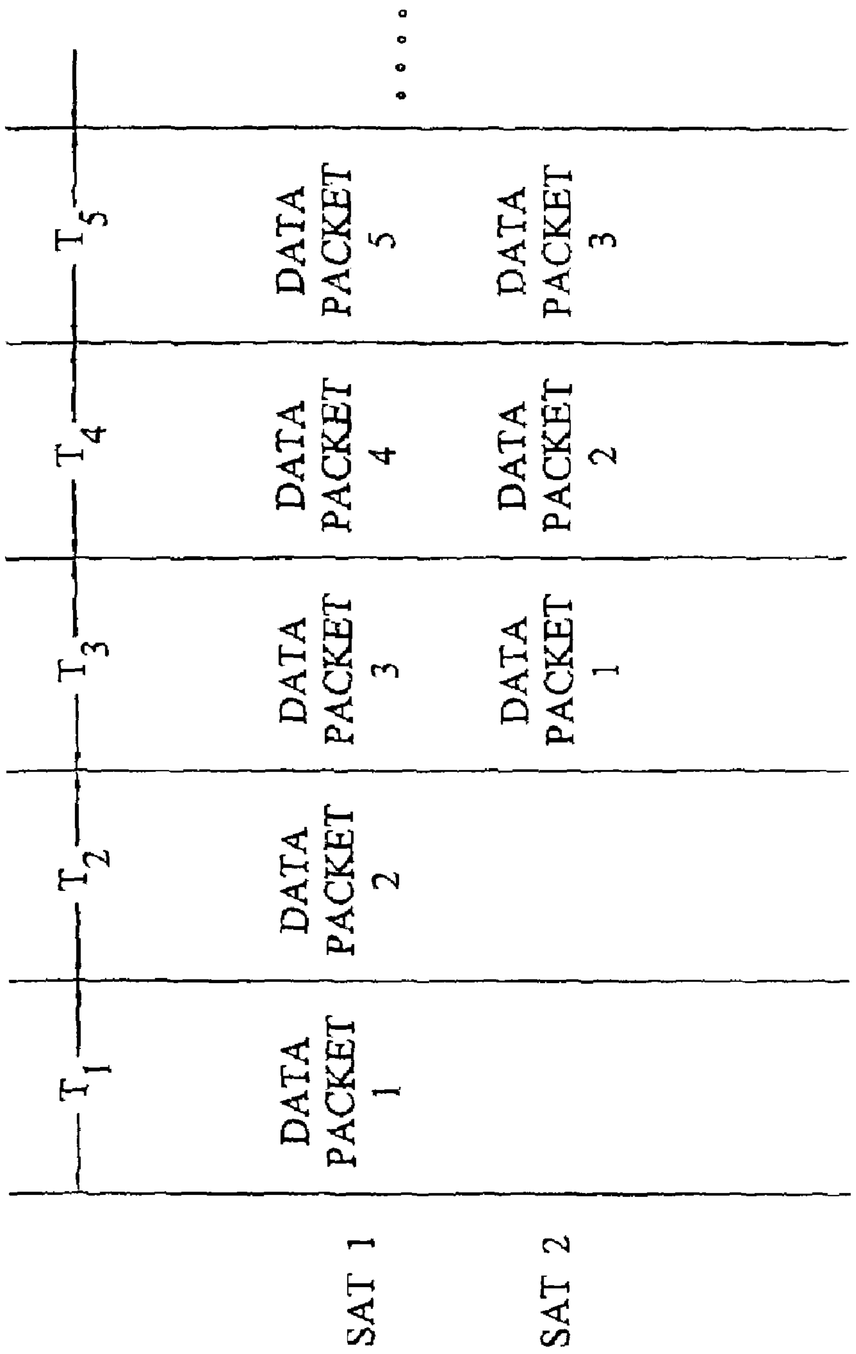
FIG. 2 is a timing diagram of exemplary signals from the satellites of the SDAR communication system of FIG. 1.

A timing diagram of one embodiment of the signals from satellites 12 and 14 is shown in FIG. 2. In this embodiment, satellites 12, 14 provide for time diversity. More particularly, satellites 12, 14 transmit substantially identical signals wherein the signal from satellite 14 (Sat 2) is time delayed by a time period $2T_x$ relative to the signal from satellite 12 (Sat 1).

Each of the signals from satellites 12, 14 includes a series of time sequenced data packets wherein the transmission of each data packet can have an equal time duration $T_x$. For ease of illustration, the time delay between the signals is shown in FIG. 2 as being twice as long as the time duration of the transmission of one data packet. However, it is to be understood that the time delay between the signals can be any integer or non-integer multiple of the time duration of the transmission of one data packet. In a preferred embodiment, the time delay between the signals can be approximately 4 seconds, which can be thousands of times greater than the time duration of the transmission of one data packet.

Figure 3:
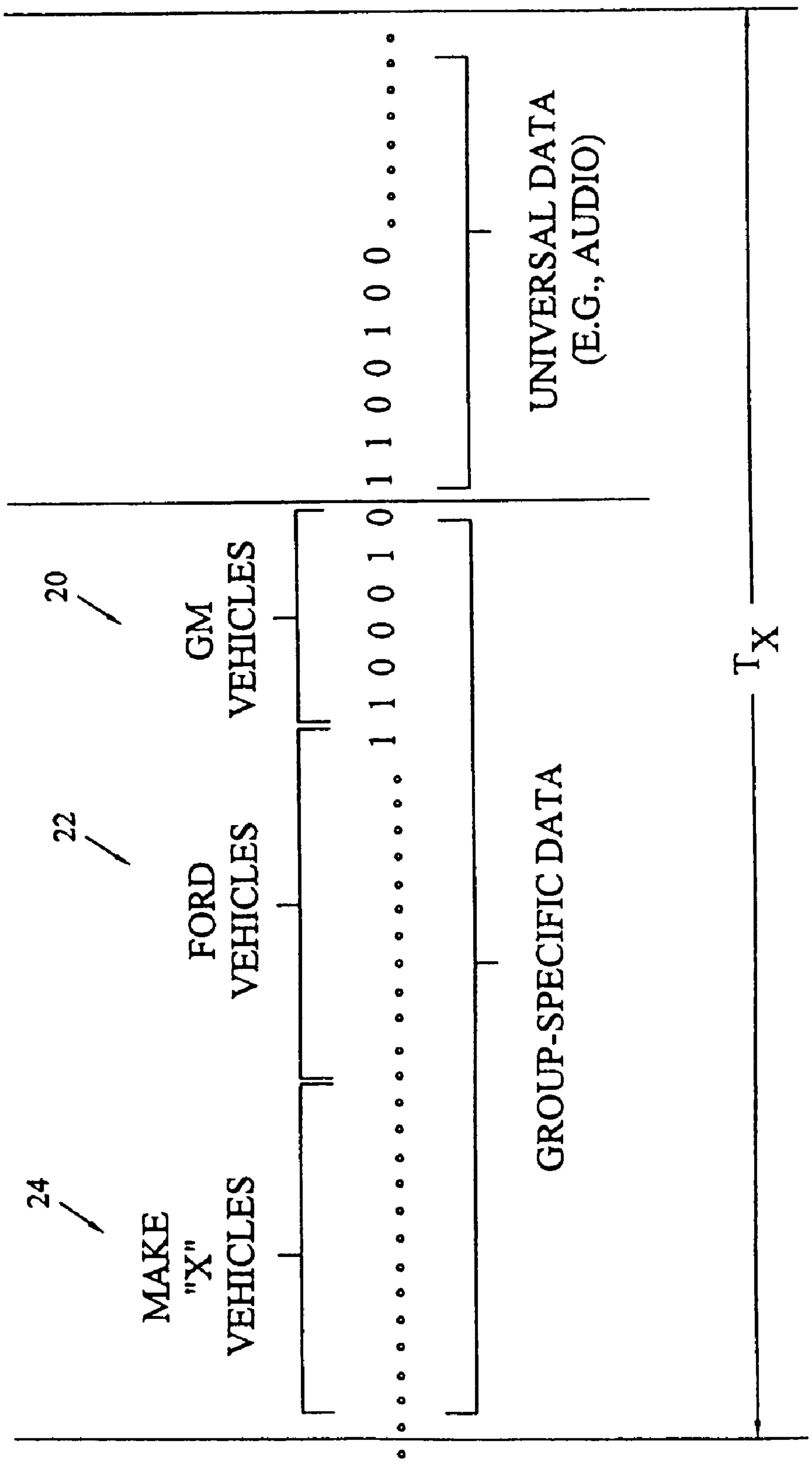
FIG. 3 is a timing diagram of an exemplary one of the data packets of FIG. 2.

One embodiment of a format for a data packet is shown in FIG. 3. Although only one data packet is shown in FIG. 3, it is to be understood that the format of each data packet included in the signals from satellites 12, 14 can be identical. Each data;packet can include both universal data and group-specific data. Universal data is defined herein as data that is relevant to all of portable receivers 16 and mobile receivers 17. For example, universal data may include audio data that receivers 16, 17 can transform into audible signals such as music or voices originating from one of a variety of radio stations. The audible signals can be broadcast by speakers associated with corresponding receivers 16,17.

Group-specific data is defined herein as data that is relevant to less than all of receivers 16, 17. For example, group-specific data may include data that is relevant to only a corresponding sub-group of mobile receivers 17. In the exemplary embodiment of FIG. 3, one group-specific segment 20 of the group-specific data is relevant to only mobile receivers 17 that are in vehicles manufactured by General Motors Corporation. Another segment 22 may be relevant to only receivers 17 that are in Ford vehicles. Yet another segment 24 may be relevant to only receivers 17 that are in vehicles of another make.

Although only three segments 20, 22, 24 are shown in FIG. 3 in order to simplify the illustration, it is to be understood that the group-specific data can have any number of segments that are each relevant to less than all of receivers 16, 17. Moreover, each of the group-specific segments can have a length of any number of bits. Further, each segment length can be equal, or each segment can have its own respective bit length. Further still, although FIG. 3 shows only one segment of consecutive bits being relevant to a particular sub-group of receivers, it is possible for the group-specific data that is relevant to only a particularly sub-group of receivers to be comprised of a plurality of segments of bits wherein the segments are not transmitted consecutively in time. That is, data segments relevant to only a particular sub-group can be interspersed in time with data segments that are relevant to only one or more other particular sub-groups.

Segments 20, 22, 24 are shown as each being relevant to only receivers in a corresponding make of automobile. However, it is to be understood that each segment can be specific, i.e., relevant, to any type of sub-group of receivers 16 and/or 17. For example, a group-specific segment can be relevant to only receivers 16 or to only receivers 17. Other examples of types of sub-groups of receivers include: receivers having associated visual displays for displaying information included in the group-specific data; receivers on vehicles 15 that are capable of processing traffic information included in the group-specific data; or receivers on vehicles 15 that are capable of responding to commands included in the group-specific data, such as by the vehicles 15 transmitting location information to a central office.

It is possible for the group-specific data to be audio data or non-audio data. That is, the group-specific data can be audio data that can be transformed by a receiver 16 or 17 into an audible signal broadcast by one or more speakers associated with receiver 16, 17. Alternatively, the group-specific data can be non-audio data that can be transformed by a receiver 16 or 17 into a visual display, or into a digital signal that can be received by a controller within vehicle 15, such as an engine control module (ECM).

As should be clear from the above description, the present invention places few, if any, restrictions on the format or content of the group-specific data, or on the types of receivers addressed by the group-specific data.

A segment of group-specific data, such as segment 20, can be in predetermined time locations within each data packet of the signals from satellites 12, 14. For example, in the embodiment shown in FIG. 3, the last six bits of the group-specific data within each data packet can be designated as segment 20, i.e., data that is relevant to only vehicles manufactured by General Motors Corporation. Thus, a receiver in a General Motors vehicle can be programmed to select and process only segment 20 of the group-specific data. That is, since a receiver placed in a General Motors vehicle knows that the only group-specific information that is relevant to that receiver is going to be in the same predetermined time locations in each data packet, the receiver can ignore the group-specific data in other locations in the data packets. Further, receivers in Ford vehicles can be programmed to select and process only segment 22 in each data packet. More generally, each type of receiver can be programmed with the predetermined locations of the group-specific data that is relevant to that type of receiver. Thus, each type of receiver can be programmed to select and process only the group-specific data that is relevant to that type of receiver. In contrast, each receiver 16, 17 can select and process all of the universal data within each data packet.

Figure 4:
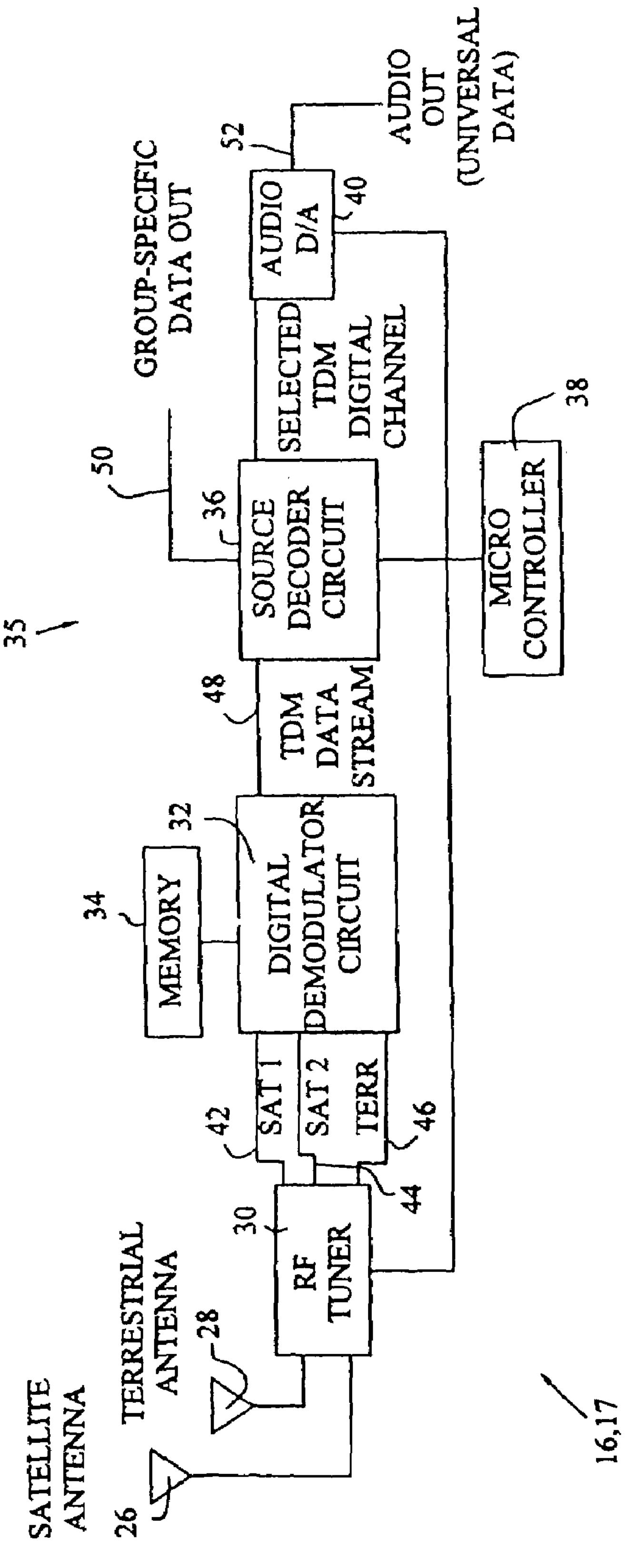
FIG. 4 is a block diagram of one embodiment of the receiver of FIG. 1.

One embodiment of a receiver 16 or 17 of the present invention is shown in FIG. 4. That is, a portable receiver 16 or a mobile receiver 17 can be embodied by the receiver shown in FIG. 4. Receiver 16, 17 include a satellite antenna 26, a terrestrial antenna 28, a radio frequency (RF) tuner 30, a digital demodulator circuit 32, a memory device 34, and an output circuit 35 including a source decoder circuit 36, a microcontroller 38, and an audio digital to analog converter 40. Satellite antenna 26 receives the signals from satellites 12, 14, and terrestrial antenna 28 receives the signals from repeaters 18; 19. RF tuner 30 receives the signals from antennas 26, 28 and functions as a bandpass filter to filter out frequencies that are outside of a frequency range of interest, as is well known in the art. In a preferred embodiment, RF tuner 30 down converts frequencies approximately between 2320 MHz and 2345 MHz. RF tuner 30 can separate the signals received from satellites 12, 14 and repeaters 18, 19 into three respective signals Sat 1, Sat 2 and Terr. RF tuner 30 can also separately transmit these signals on lines 42, 44, 46, respectively.

Digital demodulator circuit (DDC) 32 receives from lines 42, 44, 46 the three signals, which ideally contain substantially identical information, and outputs a single time division multiplexed (TDM) data stream or data signal on line 48. DDC 32 generally combines the three received signals, each of which can having missing portions due to signal obstruction or interference, into one combined signal that has fewer or perhaps even no missing portions. DDC 32 also generally selects only relevant segments of the group-specific data for inclusion in the TDM data signal on line 48. That is, DDC 32 does not include in the TDM data signal on line 48 portions of the signals on lines 42, 44, 46 that are irrelevant to the receiver. Output circuit 35 generally transforms the combined signal on line 48 into a group-specific data output signal on line 50 and a universal output signal on line 52. In a preferred embodiment, the group-specific signal on line 50 can be a non-audio signal, and the universal signal on line 52 can be an audio signal.

Figure 5:
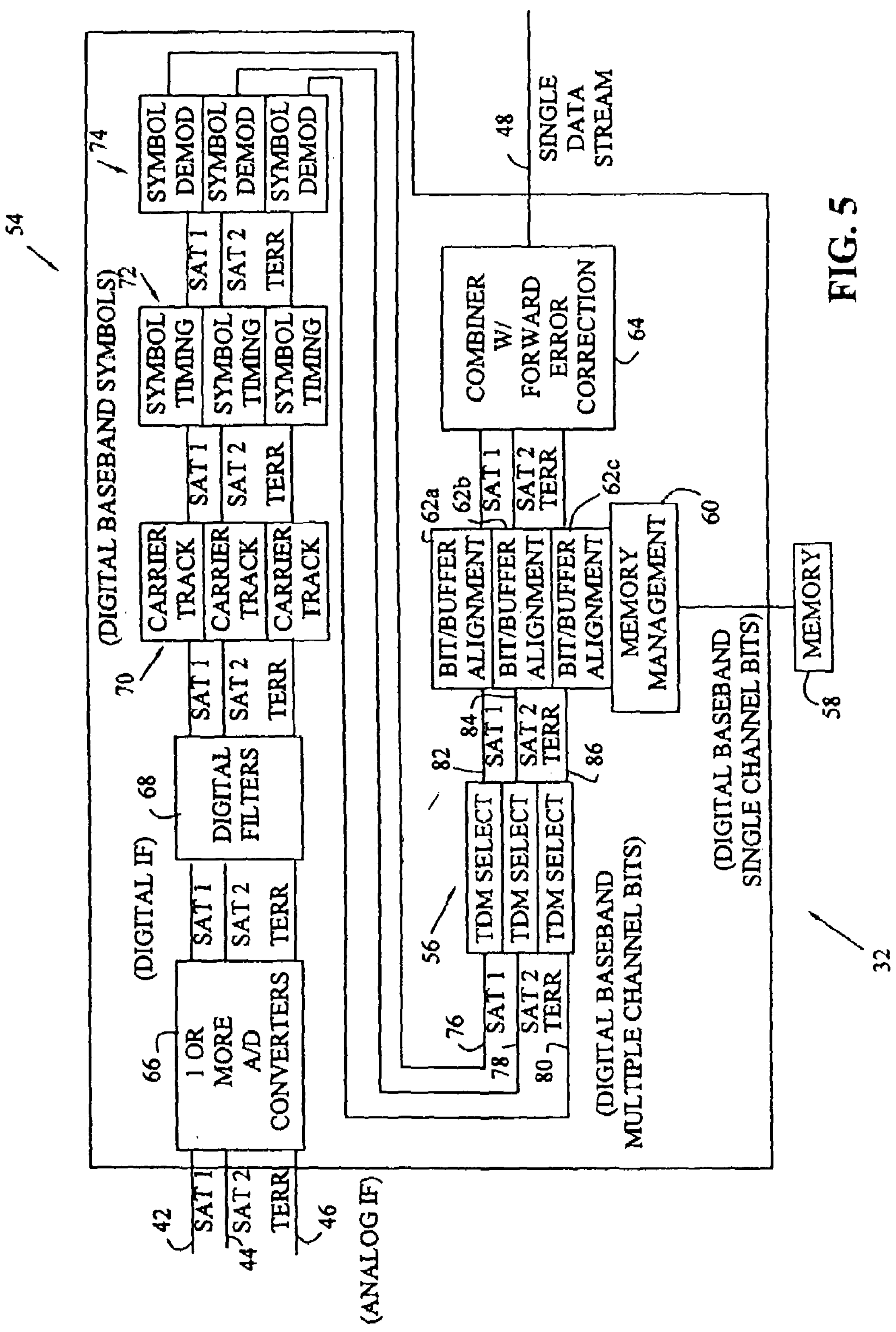
FIG. 5 is a block diagram of one embodiment of the digital demodulator circuit and memory device of FIG. 4.

One embodiment of digital demodulator circuit 32 is shown in FIG. 5. DDC 32 includes first stage circuitry 54, time division multiplexing circuits 56, a memory device 58, memory management circuit 60, bit/buffer alignment circuits 62*a*, 62*b*, 62*c* and a combiner 64. First stage circuitry 54 includes analog to digital converter(s) 66, digital filters 68, carrier track circuits 70, symbol timing circuits 72 and symbol demodulation circuits 74. First stage circuitry 54 generally prepares the analog signals received on lines 42, 44, 46 for being combined into a single digital signal that is output on line 48. The operation of first stage circuitry 54 is familiar to those of skill in the art, and therefore is not discussed in detail herein.

TDM select circuits 56 select the segments of universal data and relevant group-specific data from the digital signals on each of respective lines 76, 78, 80. More particularly, TDM select circuits 56 are programmed to select data bits from predetermined time locations in the data packets in the signals on lines 76, 78, 80. Information identifying these predetermined locations can be programmed into or otherwise provided to the receiver. The information identifying the predetermined locations can be stored in memory device 58 or within TDM select circuits 56, for example. The predetermined time locations in the data packets contain universal data as well as group-specific data that is relevant to the receiver into which the information identifying the predetermined locations is programmed.

The universal and group-specific data selected by TDM select circuits 56 from the signals on lines 76, 78, 80 are output on respective lines 82, 84, 86 to respective bit/buffer alignment circuits 62*a*, 62*b*, 62*c*. Thus, bit/buffer alignment circuit 62*a* receives the Sat 1 signal from satellite 12. Bit/buffer alignment circuit 62*b* receives the time delayed version of the Sat 1 signal, i.e., the Sat 2 signal, from satellite 14. Finally, bit/buffer alignment circuit 62*c* receives the Terr signal from one of repeaters 18, 19.

Memory management circuit 60 stores in memory device 58 the segments of universal data and group-specific data in bit/buffer alignment circuit 62*a* that has been most recently received. After memory device 58 has become filled to capacity, memory management circuit 60 continually overwrites the oldest data in memory device 58 with the most recently received data in bit/buffer alignment circuit 62*a*. The amount of data stored in memory device 58 can be equal to or greater than the amount of relevant group-specific data and universal data transmitted during the time delay between the Sat 1 and Sat 2 signals. That is, with the time delay as indicated in FIG. 2, the relevant group-specific data and universal data of at least two data packets can be contemporaneously stored in memory device 58. Since memory management circuit 60 stores only the relevant segments of the Sat 1 signal, as selected by TDM select circuits 56, the required capacity of memory device 58 is less than it would be if the irrelevant group-specific data were also stored therein. Given the potentially large volume of the group-specific data included in a signal and the high cost of memory, it can be understood that the present inventive method of selecting only relevant group-specific data for storage makes feasible the inclusion of group-specific data in an SDAR signal.

Combiner 64 combines the stored segments of universal data and relevant group-specific data from memory device 58 with the time delayed signal from Sat 2 and the Terr signal from one of terrestrial repeaters 18, 19 to create a combined signal output on line 48. More particularly, if the time delayed Sat 2 signal is incompletely received, such as due to the host vehicle 15 traveling through a tunnel and temporarily losing reception of the Sat 2 signal, then combiner 64 can replace the missing or incompletely received data segments in the Sat 2 signal with Sat 1 signal data stored in memory device 58. Thus, all of the relevant group-specific and universal data transmitted in the Sat 1 signal that has not yet been transmitted in the Sat 2 signal can be stored in memory device 58 so that the data is available to combiner 64 in the event that data is missing in the Sat 2 signal. If data is missing from both the Sat 1 signal and the Sat 2 signal, such as due to the host vehicle 15 being stuck in traffic between large buildings that block satellite signal transmissions, then combiner 64 may replace the missing data in the Sat 1 signal and the Sat 2 signal with data from the Terr signal. Due to the time required for the data manipulation by combiner 64, the resulting combined output signal on line 48 can be time delayed relative to the Sat 2 signal.

Output circuit 35 can transform the combined signal on line 48 into a group-specific data output signal and a universal data output signal. In a preferred embodiment, source decoder circuit 36 can output a group-specific non-audio output signal on line 50, and audio D/A 40 can output a universal audio output signal on line 52.

Figure 6:
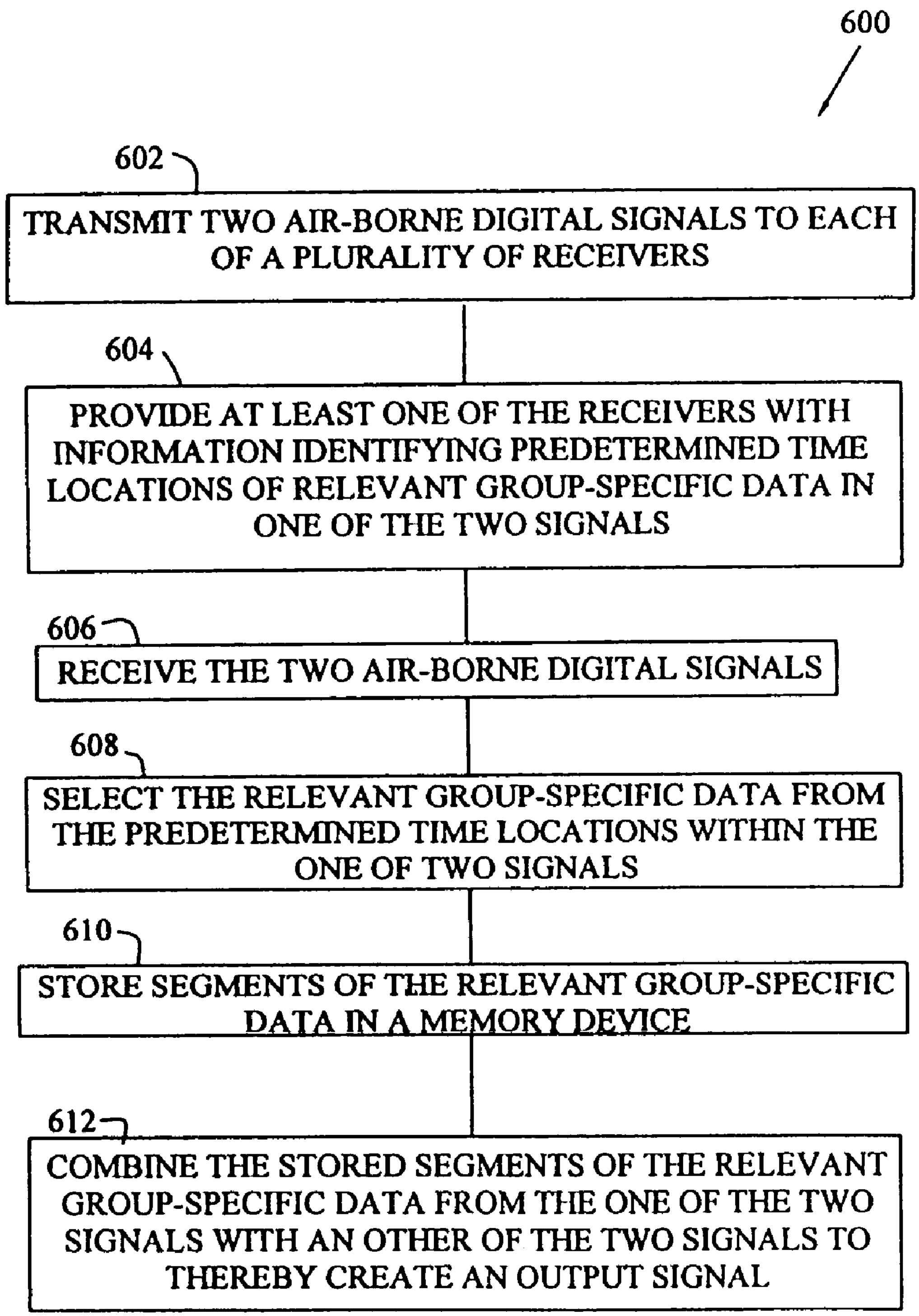
FIG. 6 is a flow chart of one embodiment of a method of the present invention.

One embodiment of a method 600 of the present invention for communicating air-borne digital data is illustrated in FIG. 6. In a first step (step 602), two air-borne signals are transmitted to each of a plurality of receivers. For example, in the embodiment illustrated in FIGS. 1-5, satellites 12, 14 can transmit two air-borne radio frequency signals to receivers 16, 17. In a next step (step 604), at least one of the receivers is provided with information identifying predetermined time locations of relevant group-specific data in one of the two signals. That is, all receivers 17 installed in General Motors vehicles 15 can be pre-programmed with information identifying the predetermined time locations of the universal data and the group-specific data that is relevant to only General Motors vehicles. The predetermined time locations can be within the data packets of the group-specific data and the universal data in the Sat 1 signal, the Sat 2 signal, and/or the Terr signal.

The two air-borne digital signals transmitted in step 602 are then received (step 606). For example, all of receivers 16, 17 receive the signals transmitted from satellites 12, 14. In a next step (step 608), the relevant group-specific data from the predetermined time locations within the one of the two signals is selected. More particularly, receivers 17 installed in General Motors vehicles 15 can select the group-specific data that is relevant to General Motors vehicles and/or receivers according to the predetermined time location information provided in step 604. The predetermined time location information may also specify the locations within the data packet where universal data can be found and selected. In the example illustrated in FIGS. 3 and 5, a TDM select circuit 56 of a receiver 17 in a General Motors vehicle 15 would select the final six bits of the group-specific data and all bits of the universal data.

Next, segments of the relevant group-specific data are stored in a memory device (step 610). For example, a memory management circuit 60 could store in memory device 58 a segment including the last six bits of the group-specific data and a plurality of segments of the universal data of the most recently received data packet. This most recent data can be written over the least recent data stored in memory device 58. The amount of group-specific data and universal data that is contemporaneously stored in memory device 58 can correspond to a time period of transmission that is at least as long as the time delay between signals Sat 1 and Sat 2. More specifically, in the example of FIG. 2, at least two data packets of relevant group-specific data and universal data could be contemporaneously stored in memory device 58 in view of the fact that the time delay between signals Sat 1 and Sat 2 corresponds to the data of two data packets.

In a final step (step 612), the stored segments of the relevant group-specific data from the one of the two signals is combined with an other of the two signals to thereby create an output signal. In the exemplary embodiment illustrated in FIGS. 1-5, the segments of group-specific data and universal data that are from the Sat 1 signal and that are stored in memory device 58 can be combined with the Sat 2 signal as well as with the Terr signal to create a combined output signal on line 48. Such combining of the signals is particularly useful in the event that a recently received portion of the Sat 2 signal is missing some data due to lost reception of the signal. That is, the missing data in the Sat 2 signal can be replaced by segments of the data from the Sat 1 signal stored in memory device 58. Further, if particular data is missing from both the Sat 1 and Sat 2 signals, the missing data may be retrieved from the Terr signal.

The embodiments disclosed above primarily describe an application wherein the Sat 1 and Sat 2 signals are substantially identical but time delayed relative to each other. It is to be understood that the present invention also encompasses applications wherein the Sat 1 and Sat 2 signals contain substantially identical information, but their formats are different such that the two signals are not substantially identical. In such an application, where one signal is not a time delayed version of the other, it may be necessary to store relevant data from each of the Sat 1 and Sat 2 signals in a memory device 58 to better enable missing data to be replaced with stored data.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

I claim:

1. A method of communicating data in a satellite digital audio radio (SDAR) system, said method comprising:

transmitting two radio frequency digital signals from respective satellites to each of a plurality of SDAR receivers, the two signals including substantially identical information, each of said SDAR receivers being disposed within a respective one of a plurality of motor vehicles, each of the signals including universal data and group-specific data, the universal data being relevant to each of said SDAR receivers, the group-specific data being relevant to less than all of said SDAR receivers, at least one segment of the group-specific data that is relevant to only a corresponding group of said SDAR receivers being in at least one predetermined time location within one of the two signals;

providing at least one of the SDAR receivers in the corresponding group with information identifying the at least one predetermined time location; and using said at least one SDAR receiver to:

receive the two radio frequency digital signals;

select the at least one segment of the group-specific data from the at least one predetermined time location within the one of the two signals;

store the at least one segment of the group-specific data in a memory device;

store at least one segment of the universal data from the one of the two signals in the memory device;

combine the stored at least one segment of the group-specific data from the one of the two signals with group-specific data from an other of the two signals to thereby create a group-specific output signal; and combine the stored at least one segment of the universal data with universal data from the other of the two signals to thereby create a universal output signal.

2. The method of claim 1 wherein the other of the two signals is time delayed relative to the one of the two signals, the at least one segment of the group-specific data stored in said memory device corresponding to a time period that is at least at long as the time delay between the signals.

3. The method of claim 2 wherein the two signals are substantially identical to each other.

4. The method of claim 2 wherein each of the signals includes a series of time sequenced data packets, each of the data packets including both group-specific data and universal data, the group-specific data including a plurality of segments that are relevant to only corresponding groups of said SDAR receivers, each of the segments of the group-specific data being in corresponding predetermined time locations within each of the data packets.

5. The method of claim 2 wherein the at least one segment of the group-specific data stored in said memory device comprises at least one most recently received segment of the group-specific data, said method including periodically overwriting the at least one segment of the group-specific data stored in said memory device with the at least one most recently received segment of the group-specific data.

6. The method of claim 1 wherein the group-specific output signal comprises a group-specific non-audio output signal, the universal output signal comprising a universal audio output signal.

7. The method of claim 1 wherein said at least one receiver uses the stored at least one segment of the group-specific data to replace at least one incompletely received segment of the group-specific data in the other of the two signals to thereby create the group-specific output signal, and uses the stored at least one segment of the universal data to replace at least one incompletely received segment of the universal data in the other of the two signals to thereby create the universal output signal.

8. A method of communicating air-borne digital data to a motor vehicle, said method comprising:

transmitting two air-borne digital signals to each of a plurality of receivers, the two signals including substantially identical information, each of said receivers being disposed within a respective one of a plurality of motor vehicles, each of the signals including universal data and group-specific data, the universal data being relevant to each of said receivers, the group-specific data being relevant to less than all of said receivers, at least one segment of the group-specific data that is relevant to only a corresponding group of said receivers being in at least one location within one of the two signals;

providing at least one of the receivers in the corresponding group with information identifying the at least one location; and using said at least one receiver to:

receive the two air-borne digital signals;

select the at least one segment of the group-specific data from the at least one location within the one of the two signals;

store the at least one segment of the group-specific data in a memory device; and combine the stored at least one segment of the group-specific data from the one of the two signals with an other of the two signals to thereby create an output signal.

9. The method of claim 8 wherein the two air-borne digital signals are transmitted from respective satellites.

10. The method of claim 8 wherein said receivers comprise satellite digital audio radio receivers.

11. The method of claim 8 wherein the other of the two signals is time delayed relative to the one of the two signals, the at least one segment of the group-specific data stored in said memory device corresponding to a time period that is at least at long as the time delay between the signals.

12. The method of claim 11 wherein the two signals are substantially identical to each other.

13. The method of claim 11 wherein each of the signals includes a series of time sequenced data packets, each of the data packets including both group-specific data and universal data, the group-specific data including a plurality of segments that are relevant to only corresponding groups of said receivers, each of the segments of the group-specific data being in corresponding predetermined time locations within each of the data packets.

14. The method of claim 11 wherein the at least one segment of the group-specific data stored in said memory device comprises at least one most recently received segment of the group-specific data, said method including periodically overwriting the at least one segment of the group-specific data stored in said memory device with the at least one most recently received segment of the group-specific data.

15. The method of claim 8 wherein the output signal comprises a group-specific non-audio output signal, said method comprising the further step of using said at least one receiver to create a universal audio output signal.

16. The method of claim 15 wherein said at least one receiver stores at least one segment of the universal data from the one of the two signals in the memory device and combines the stored at least one segment of the universal data with the other of the two signals to thereby create the universal audio output signal.

17. The method of claim 8 wherein said at least one receiver uses the stored at least one segment of the group-specific data to replace at least one incompletely received segment of the group-specific data in the other of the two signals to thereby create the output signal.

18. The method of claim 8 wherein the at least one location comprises at least one predetermined time location.

19. A receiver in a motor vehicle for receiving air-borne digital data, said receiver comprising:

at least one antenna configured to receive two air-borne digital signals including substantially identical information, each of the signals including universal data and group-specific data, all of the universal data being relevant to said receiver, the group-specific data including at least one segment that is relevant to said receiver, and at least one segment that is irrelevant to said receiver, the at least one relevant segment being in at least one predetermined time location within one of the two signals;

a memory device storing information identifying the at least one predetermined time location;

a data selecting device operable to select the at least one relevant segment of the group-specific data from the at least one predetermined time location within the one of the two signals;

a memory management device operable to store the at least one relevant segment of the group-specific data in said memory device; and a data combining device operable to combine the stored at least one relevant segment of the group-specific data from the one of the two signals with an other of the two signals.

20. The receiver of claim 19 wherein the other of the two signals is time delayed relative to the one of the two signals, the at least one segment of the group-specific data stored in said memory device corresponding to a time period that is at least at long as the time delay between the signals.

21. The receiver of claim 20 wherein the two signals are substantially identical to each other.

22. The receiver of claim 20 wherein said memory management device is operable to:

store at least one most recently received relevant segment of the group-specific data in said memory device; and periodically overwrite the at least one relevant segment of the group-specific data stored in said memory device with the at least one most recently received relevant segment of the group-specific data.

23. The receiver of claim 19 wherein the memory management device is further operable to store at least one segment of the universal data from the one of the two signals in said memory device, and said data combining device is further operable to combine the stored at least one segment of the universal data from the one of the two signals with the other of the two signals to thereby create a combined signal, said receiver further comprising a processing circuit operable to transform the combined signal into a group-specific non-audio output signal and a universal audio output signal.

24. The receiver of claim 23 wherein said combining device is operable to:

use the stored at least one relevant segment of the group-specific data to replace at least one incompletely received relevant segment of the group-specific data in the other of the two signals; and use the stored at least one segment of the universal data to replace at least one incompletely received segment of the universal data in the other of the two signals.

* * * * *